(12) United States Patent
De La Forterie

(10) Patent No.: US 6,326,892 B1
(45) Date of Patent: Dec. 4, 2001

(54) MINIATURIZED ELECTRONIC CASING FOR MONITORING THE COLD CHAIN FOR PERISHABLE PRODUCTS

(76) Inventor: Bruno Guy Thierry De La Forterie, 23 avenue Victor Hugo, 92500 Rueil-Malmaison (FR)

( * ) Notice: Subject to any disclaimer, the term of this patent is extended or adjusted under 35 U.S.C. 154(b) by 0 days.

(21) Appl. No.: 09/553,401

(22) Filed: Apr. 20, 2000

(51) Int. Cl.⁷ .................................................. G08B 17/00
(52) U.S. Cl. ............................................ 340/588; 374/102
(58) Field of Search .................................. 340/588, 693.5, 340/585; 374/102, 103; 604/404; 206/459.1

(56) References Cited

U.S. PATENT DOCUMENTS

| | | | |
|---|---|---|---|
| 4,061,033 | * | 12/1977 | Nixon .................................... 374/103 |
| 4,385,289 | * | 5/1983 | McMillan .............................. 340/585 |
| 4,855,721 | * | 8/1989 | Hallett .................................. 340/585 |
| 5,211,476 | * | 5/1993 | Coudroy ............................... 374/102 |
| 5,262,758 | * | 11/1993 | Nam et al. ........................... 340/588 |
| 5,424,720 | * | 6/1995 | Kirkpatrick .......................... 340/585 |

* cited by examiner

Primary Examiner—Thomas Mullen
(74) Attorney, Agent, or Firm—Armstrong, Westerman Hattori, McLeland & Naughton, LLP

(57) ABSTRACT

An electronic device for monitoring the cold chain of a product, which measures the temperature, carries out the product of the measured temperature by a determined coefficient depending on the temperature, successively adds the products and records the running total obtained, and which includes a visual control. The measuring of the temperature is carried out at regular time intervals.

6 Claims, 1 Drawing Sheet

MINIATURIZED ELECTRONIC CASING FOR MONITORING THE COLD CHAIN FOR PERISHABLE PRODUCTS

TECHNICAL FIELD

The present invention relates to a miniaturized electronic device for monitoring the cold chain.

Certain objects or perishable products need a low temperature for their conservation, both during the period of storage and their transportation. If the cold chain breaks down, these products must be rapidly used within a period of a few hours. Food items such as meats or cream desserts are clear examples, but this constraint applies also to other products such as blood components; a red corpuscle concentrate can be stored in a blood bank for 42 days at +4° C. Once it is distributed by the blood transfusion institution, this concentrate must be used very quickly if the room temperature exceeds +10° C. A control of the integrity of the cold chain is thus necessary.

An important factor for the conservation quality of the products is the time/temperature factor: a product normally stored at a low temperature is altered if the room temperature increases. This alteration is important if the duration of exposition to heat is prolonged and if the temperature is high, but an exposition too prolonged at a low temperature can at times be more damaging to the quality of the product.

BACKGROUND ART

At present there are monitoring systems of the chemical reagent or the colored ink type on the market which are not always satisfactory, because these systems do not give any indication of the duration of exposition (for example a brutal change of color of a reagent at a given temperature, whatever the duration), or in case they give an estimate of the duration there is no infornation about the variations of temperature to which the object under supervision has been submitted, (for example, a system of strips which color themselves progressively depending on the time since a certain temperature is reached; the speed of absorption is the same whichever the temperature to which the object has been submitted).

DISCLOSURE OF THE INVENTION

A simple method to estimate the quantity of heat to which an object under supervision has been submitted consists in measuring at regular intervals either the room temperature to which the product is submitted or the temperature of the product itself. Each value is registered and then added. At the end of the supervision period, the reading of the total registered values gives an estimate of the quantity of heat to which the product has been submitted. For example, a product exposed to a temperature of 15° C. for 10 minutes, then to 20° C. for 30 minutes, will give as a final value the total of 150 for a reading of temperature every 5 minutes, on condition that the value 15 for 15° C. and 20 for 20° C. ((15×2)+(20×6)=150) is given.

If we consider that the alteration of a product is very important at high temperatures, we can apply for each measured value a corrector coefficient in order to take this risk into account in the abovementioned example, if a multiplier coefficient of 2 for value 15 and a coefficient 4 for value 20 is given, then the digit of 540 ((15×2)×2)+((20×6)×4)=540 will result as a final value.

The present invention relates to an electronic device for monitoring the cold chain of a product. Like all such devices, it includes a means to measure the temperature, a means to carry out the product of the measured temperature by a coefficient determined depending on the temperature, a means to add successively the products and to record the running total obtained, and a visual control means.

Such a device is already described in the U.S. Pat. No. 4,061,033 document. The device of the prior art is provided for the checking of food products, in particular of fish, for which it is absolutely necessary to continuously measure the temperature of the product. In order to achieve this, according to this document, the device includes three or four transistors, of which only one operates in relation to the measured temperature range in such a way so as to act on the frequency of impulses generated on the outlet, a counter of these impulses being connected to this outlet to estimate the state of conservation of the fish.

The scope of this invention is completely different as this invention is applied to products which are stable when cold and perishable at room temperature, namely blood. The checking of the cold chain is then not necessary during conservation in cold, but it must be activated when the product is taken out for its possible utilization.

It is in fact difficult for a surgical team to control regularly the time that a blood bag is out of its cold conservation zone, in particular because the duration of utilization of the blood bag depends essentially on the room temperature and so it is measured in minutes and not in days.

Consequently, it is unnecessary to have a device functioning permanently and, according to the invention, the measuring of the temperature is carried out at regular time intervals, preferably every 5 minutes.

This invention concerns an electronic device to estimate the quantity of heat received by a product during a given period. It comprises a miniaturized electronic casing, in which are incorporated: a means to constitute an energetic source of very small dimension of the lithium battery type, a means to measure the temperature of the electronic thermal collector type, a means to activate at regular intervals the measuring of the temperature, a means to convert these measured values according to a programmable algorithm, a means to record these converted values and to accumulate these values in a memory such as a microprocessor, a means to regulate this microprocessor such as an internal clock, a means to modify the state of an eventual visual control when a pre-established threshold value in the memory is reached and the necessary means to allow a remote control. The microprocessor is programmable. The programming of the microprocessor can modify the different parameters, such as the time interval between 2 measurements, the coefficients of the integrated algorithm, and the limit value for the activation of the eventual integrated control.

At regular intervals, by means of the rhythm of the internal clock and depending on the programming, the microprocessor will measure the temperature by means of the adapted thermal collector. The measured value is transformed by means of the algorithm previously programmed in the microprocessor and then memorized. All the values, converted and registered, are added to the memory of the microprocessor. The internal battery provides the necessary energy. The integrated system of communication at a distance allows transmitting the accumulated value in the memory of the device to an adapted external reader.

In order to render this device more autonomous and to facilitate the interpretation, it can comprise one or more visible controls (colored electronic LEDS, controls that change color, breakdown of one or more fuses). The feature of this or these controls being that they change color or state when one or more limit values previously programmed in the microprocessor are reached. The progress in electronics makes the easy integration of all these elements in a small air and watertight casing possible.

BEST MODE FOR CARRYING OUT THE INVENTION

Figure 1:
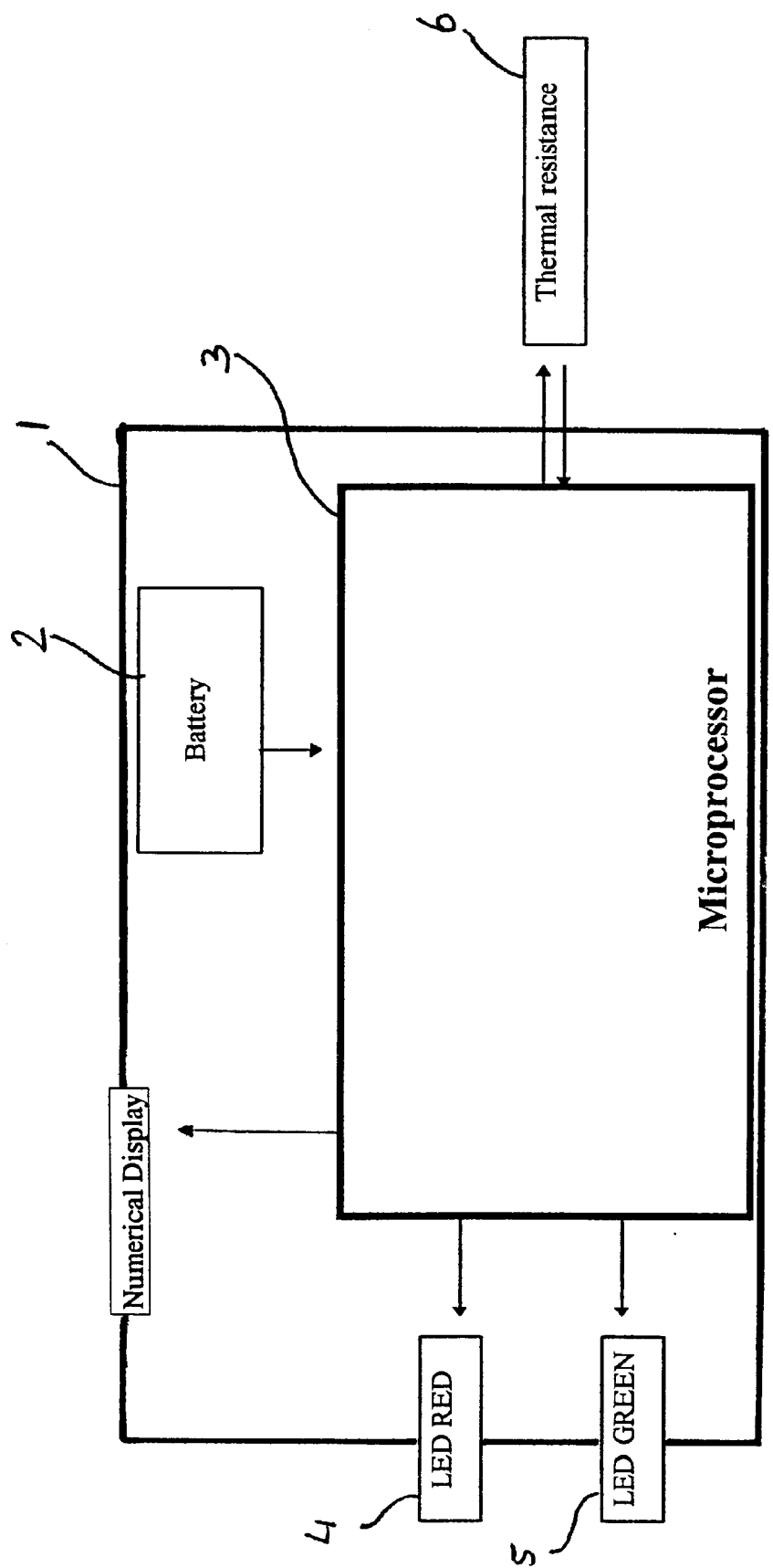
FIG. 1 is a schematic view of a device according to the invention.

The device according to the invention consists of a small air and watertight casing 1 having the shape of a disk or a tablet with a diameter of about 20 millimeters and a thickness of about 4 millimeters. The shape and the sizes are given as a non-limiting example. The inside of this casing is air and watertight, by means of the casting practice, and it includes: the energetic source 2 of small dimension (for example a lithium battery), the thermal surveyor, the programmable microprocessor 3 which integrates at the same time an analog/numerical converter, and the necessary electronic elements for a communication at a distance and the activation of the integrated control, which In this example are 2 red and green electronic LEDS 4 and 5 placed on the surface of the casing.

The arrangement of the different elements is such that the volume is reduced to the minimum. The energetic source and the microprocessor are arranged in such a way so as not to disturb the thermal resistance 6. The thermal resistance is placed in a preferential way to be situated very near the product to be monitored, for example on its surface. A double-faced adhesion system or a clamp facilitates the attachment of the device to the object to be monitored.

An autonomous remote control reader of a reduced size such as a pen completes the system, and it includes the necessary elements to communicate at a distance with the electronic casing. It can include either a small digital screen to attach the running total of values converted by the electronic casing or a control system that changes its state in case of exceeding a pre-established threshold value, as for example an electroluminescent diode.

Variants of the device may integrate in the microprocessor the clock, the thermal resistance, the remote control system, or a part or the totality of these functions. Similarly, the calculator and the memory may not be integrated in a single microprocessor but in several. Another variant of this small electronic casing can include a miniaturized system of numerical display where the memorized value will be read directly by an observer. In order to improve the traceability of the product to be monitored, this system can include the necessary elements to record other parameters, as for example the lot number of the product, the reference, the date of manufacture, the date limit of utilization, the origin etc.

This device is perfectly adapted for monitoring labile blood products. Fixed on each of the blood bags to be monitorized, this device is activated at the moment of distribution of the product to the user service (operating suite for example). At the moment of the transfusion, it is enough to verity the integrity of the control or to read the accumulated value in the memory by means of an adapted electronic reader. If this value does not exceed a pre-established threshold, the product can be transfused. Similarly, in case the product is not used, the transfusion center can read the accumulated value in the casing so as to assure that the product has not undergone an exposition to heat too long or too strong having in mind its redistribution. if the case is the contrary, the product will be destroyed. The field of application of this invention is not limited only to the monitoring of blood products. In fact this electronic casing can be adapted for monitoring the food chain, the transport and monitoring of perishable products, the transport or the monitoring of all products sensitive to heat (for example, chemical reactants).

What I claim is:

1. An electronic device for monitoring the cold chain of a product, including a means to measure the temperature, a means to carry out the product of the measured temperature by a determined coefficient depending on said temperature, a means to successively add said products and to record the running total obtained, and a visual control means, wherein the measuring of said temperature is carried out at regular time intervals.

2. A device according to claim 1, wherein said time interval is about 5 minutes.

3. A device according to claim 1, wherein said visual control means is activated when said running total reaches a determined threshold.

4. A device according to claim 1, wherein said visual control means displays the value of said running total.

5. A device according to claim 1, further comprising a means of traceability of said product.

6. An electronic device for monitoring the cold chain of a product, including a means to measure the temperature, a means to carry out the product of the measured temperature by a determined coefficient depending on said temperature, a means to successively add said products and to record the running total obtained, and a visual control means, wherein the measuring of said temperature is carried out at regular time intervals, and said visual control means includes visible controls that change color.

* * * * *